(12) United States Patent  (10) Patent No.: US 8,634,574 B2
Mah  (45) Date of Patent: Jan. 21, 2014

(54) SOUND TRANSMITTING DEVICE

(75) Inventor: Keat Boon Mah, Portage, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 825 days.

(21) Appl. No.: 12/759,473

(22) Filed: Apr. 13, 2010

(65) Prior Publication Data

US 2011/0249829 A1 Oct. 13, 2011

(51) Int. Cl.
H04R 2499/13 (2006.01)
F02M 35/12 (2006.01)
F01N 1/24 (2006.01)
F01N 1/02 (2006.01)

(52) U.S. Cl.
USPC ............. 381/86; 181/229; 181/248; 181/250; 123/184.53; 123/184.57

(58) Field of Classification Search
USPC ................... 381/86; 181/229, 248, 250, 282, 181/271–273; 123/184.53, 184.57
See application file for complete search history.

(56) References Cited

U.S. PATENT DOCUMENTS

| 2002/0039422 A1* | 4/2002 | Daly ............................. 381/71.4 |
| 2004/0060861 A1* | 4/2004 | Winter et al. ................. 210/448 |
| 2005/0201570 A1* | 9/2005 | Honji ............................... 381/86 |
| 2007/0079784 A1* | 4/2007 | Sasaki et al. ............. 123/184.53 |
| 2007/0098207 A1* | 5/2007 | Lin ............................... 381/399 |
| 2010/0329476 A1* | 12/2010 | Khami et al. ................... 381/86 |

* cited by examiner

Primary Examiner — Duc Nguyen
Assistant Examiner — George Monikang
(74) Attorney, Agent, or Firm — James Hasselbeck

(57) ABSTRACT

A device for transmitting engine sound into an interior of a motor vehicle includes a sound transmission line having a first end in acoustic communication with an air intake tract and a second end arranged to direct engine sound towards the motor vehicle interior. A sound transmitting porous media is arranged in-line with said sound transmission line and restricts airflow wherein the porous media such that airflow in the sound transmission line is required to pass through said porous media.

13 Claims, 2 Drawing Sheets

SOUND TRANSMITTING DEVICE

TECHNICAL FIELD

The invention relates to sound transmission devices for conducting engine sounds towards or into the passenger compartment of a motor vehicle.

BACKGROUND OF THE INVENTION

Various types of devices configured to conduct engine sound from the engine compartment of a motor vehicle into the passenger compartment are known. As engine designs evolve for great fuel efficiency, current varieties of motor vehicles have internal combustion engines that operate very smoothly so that the engine operating sound may be barely audible within the interior of the motor vehicle. A further reduction in engine sound may result from noise dampening foams and acoustic insulation arranged to limit the migration of road noise into the passenger compartment. The use of turbocharged engines have also caused the natural sounds of the engine to be masked by noise coming from the turbo which are high pitched and unpleasant. Additionally the engine operating sound level may become further obscured by the presence of other secondary noises such as vehicle HVAC systems, etc.

Drivers operating certain classes of sporty or higher performance vehicles appreciate and may come to expect the presence of a sporty, rumbling or throaty engine sound that is on par with the power and performance of the vehicle. The sound character from the vehicle is also a brand image directed to differentiate one particular brand from another. Given the deficiency of a suitable engine sound level in some vehicle, a need exists to restore the throaty, sporty engine sound experience to enhance the driving experience of the vehicle operator.

To remedy such deficiencies it can be desirable to provide an enhanced transmission of the engine operating sound to the interior of the motor vehicle. Suitable sound energy levels are often present in the engine air intake tract if a suitable means to direct this sound energy into the vehicle interior is provided.

It is known to provide a sound transmission tube having a sound-transmitting diaphragm, with the sound transmission tube originating at a sound pickup point near the engine (such as the air intake tract), and routed towards or into the passenger compartment. In such sound transmission devices the flexible diaphragm is installed into the sound transmission tube to provide airflow isolation while permitting the transmission of sound through the diaphragm. Use of an elastomeric diaphragm such as a rubber diaphragm is useful to provide this airflow impermeable separation between the passenger compartment interior and the sound pickup in the engine compartment. Unfortunately, such elastomeric diaphragms may also introduce frequency dependent distortions in the sound level and sound quality transmitted into the passenger compartment and experienced by the driver.

It is known to provide tuning of a transmitted sound spectrum in a vehicle sound transmission device by the addition of a quarter wave tuner or a resonator chamber installed inline with the sound transmission tubing. A quarter wave tuner is useful to attenuate or cancel a selected transmitted sound frequency. The quarter wave tuner may be positioned and connected to the sound transmission tubing so as to extend outwards from the tubing in a branch configuration, typically (although not necessarily) at about 90 degrees relative to the axis of the sound transmission tubing. Alternately, when it is desired to amplify a selected transmitted sound frequency, then an inline resonator chamber may be provided in the sound transmission tubing. If the inline resonator is configured with a duct length L, then the amplified sound wavelength will be a function of L/2. The use of quarter wave tuners and inline resonators, alone or in combination, permit the transmitted sound to be tailored using only passive devices rather than by the application of more expensive and complicated active electronic devices.

U.S. published patent application 2009/0250290A1 discloses a device for noise transmission in a motor vehicle. In this device sound is transmitted along a transmission line having an enlarged mouth at one end and an elastomeric diaphragm fitted to close off the mouth. A protective device is fitted at the end to protect the diaphragm, such as from overpressure conditions.

U.S. Pat. No. 6,600,408 B1 discloses a diaphragm device for sound transmission for a motor vehicle. In this device, the sound is transmitted along a pipe conduit and a chamber in which an elastomeric diaphragm sealably closes the end of the pipe conduit to airflow. The diaphragm closed end is arranged toward the interior of the motor vehicle. The chamber that surrounds the diaphragm is comprised of several assembled parts.

German patent publication DE 101 16 169 A1 discloses a resonator chamber in which the diaphragm is arranged.

German patent DE 44 35 296 discloses a diaphragm for noise transmission in a motor vehicle in which the diaphragm is clamped in a holder.

U.S. published patent application 2006/0283658 A1 discloses another diaphragm based noise transmission system for an intake system of a motor vehicle. Various possibilities of noise introduction into the interior of the motor vehicle are illustrated wherein the diaphragm is arranged in a pipe conduit for noise transmission.

In the German publication DE 199 30 025 A1 a sound transmission body is illustrated in which the diaphragm is clamped between two transmission members.

There remains a need in the art for a device to transmit a suitable level of engine sound into the vehicle passenger compartment that is simple in construction and eliminates the issues of detuning and distortion of the transmitted sound, particularly by a diaphragm sound transmission device.

SUMMARY OF THE INVENTION

Disclosed herein is a device for transmitting engine sound into an interior of a motor vehicle that includes a sound transmission line having a first end in acoustic communication with an air intake tract of an engine and the second end arranged to direct engine sound towards the motor vehicle interior. A sound transmitting porous media is arranged in-line with the sound transmission line and configured to restrict airflow through the sound transmission line. The porous media is arranged to require engine sound transmitted through the sound transmitting line from the first end to the second end to pass through the porous media.

According to multiple aspects of the invention, the air sound transmitting porous media provides a greater restriction to air flow than the motor vehicle air intake tract air filter element such that air flow preferably occurs through the air filter element rather than the sound transmitting porous media.

According to another aspect of the invention, the sound transmitting porous media is arranged at the second end of the sound transmission tube and the second end and porous media extends into the vehicle interior.

According to another aspect of the invention, the sound transmitting porous media and the second end are arranged in an engine compartment of the motor vehicle with the second end positioned to direct the engine sound towards the vehicle interior.

According to another aspect of the invention, the second end of the sound transmitting line is connected into HVAC ducting of the vehicle interior to deliver sound through the vehicle HVAC ducts.

According to another aspect of the invention, the sound transmitting porous media is arranged in the sound transmission line between the first and second ends, dividing the sound transmission line into a first section and a second section. The sound transmission line portion extending between the porous media and the second ends is the second section. The second section branches into a plurality of spaced apart branches arranged within the vehicle interior, each branch having a second end. The second ends of the branches are spaced apart within the vehicle interior and directed into the vehicle interior to provide a balanced sound.

According to another aspect of the invention, the sound transmitting device includes a plurality of secondary sound transmitting porous media, the secondary porous media arranged at each of the second ends of the branches. According to another aspect of the invention, an atmospheric vent is provided on the second section and vents the second section to atmosphere outside of the vehicle interior. The secondary porous media provides additional airflow restriction to cause any odors in the sound transmission line to preferably vent to the atmosphere through the atmospheric vent without reaching the interior of the vehicle.

According to another aspect of the invention, the sound transmitting porous media includes fibrous materials comprising any of: cotton, mineral wool, glass fibers, and polymeric fibers.

According to another aspect of the invention, the porous media is configured as an axial filter element having a plurality of axially aligned alternately closed channels with the filter element formed of wound layers of flat and formed porous sheet material.

According to another aspect of the invention, the sound transmitting porous media includes porous foam.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
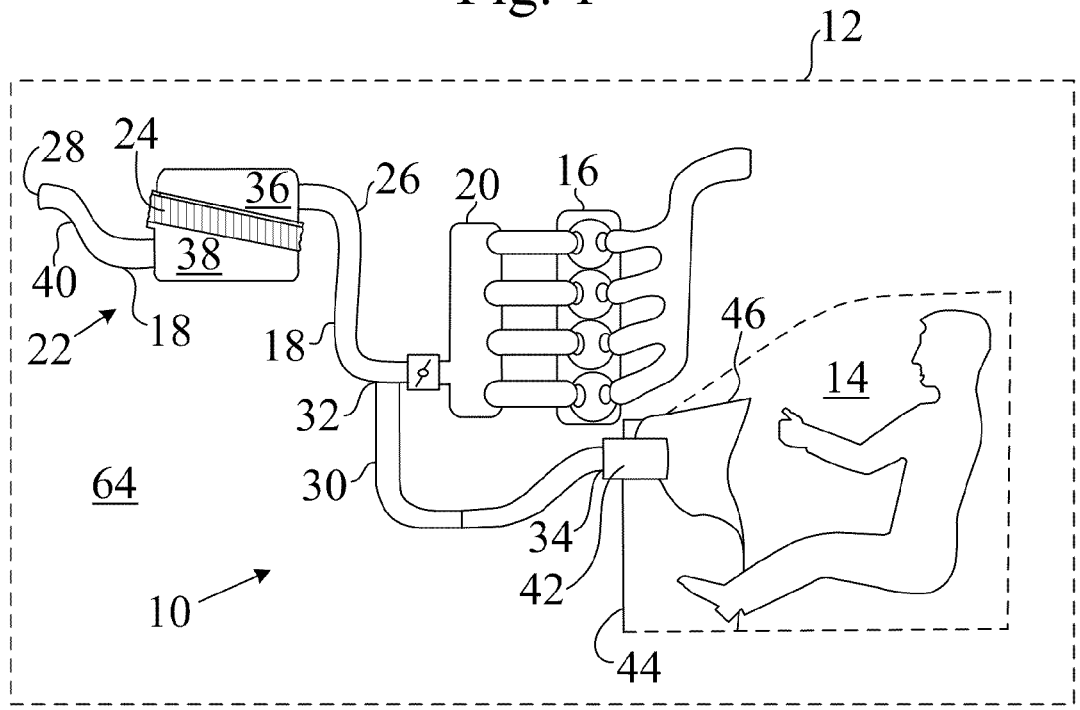
FIG. 1 is a schematic depiction of a motor vehicle including a device for transmitting engine sound into the interior of the motor vehicle, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an engine sound transmitting device as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a schematic depiction of a motor vehicle 12 including a device 10 for transmitting engine sound into the interior 14 of the motor vehicle 12, consistent with the present invention. Arranged in the motor vehicle is an internal combustion engine 16 configured and connected to provide motive power to the vehicle, such as by use of mechanical transmission means (for example: transmission, drive shaft(s) etc) or alternately by electrical means (such as by driving a generator to produce electricity to charge on-board batteries and/or operate vehicle electric drive motor(s). In these cases, an internal combustion engine operates in the vehicle and it may be desirable to transmit an enhanced level of engine sound towards or into the vehicle interior 14 for an enhanced driving experience.

The engine 16 includes an air intake tract 18 comprising air guiding ducting or piping configured to provide clean combustion air to the engine 16 so as to facilitate the combustion of fuel for operation of the engine 16. The air intake tract may include an intake manifold 20 secured to the engine 16 and having one or more runners communicating combustion air to the intake valves of the engine. Normal operation of the engine 16 may be expected to produce significant sympathetic pressure and sound pulsations within the air intake tract 18, particularly travelling back through the intake manifold 20 of FIG. 1. The pressure and sound pulsations within the intake tract 18 are inherently synchronized to and driven by the timing of the intake stroke and power stroke of each cylinder in the engine 16 and therefore correspond to the operating load and speed of the engine 16. Sound and pressure pulsations migrate backwards through the air intake tract 18 in the direction of the air cleaner 22. Motor vehicle air cleaners typically include an air filter element 24 operable to limit or prevent particulate contaminants from entering the clean side 28 of the air intake tract 18 and then finding their way to the engine 16. Furthermore and relevant to the invention, the air filter element 24 inherently introduces an air flow restriction in the air intake tract that maintains increased levels of pulsations within the air intake tract, rather than allowing direct venting to the atmosphere at the air intake 28 which would tend to somewhat dampen these pulsations.

These engine sound pulsations in the intake tract are useful to providing a throaty, sporty engine sound experience in the interior of the motor vehicle if they can be suitably transmitted thereto. As used herein, by the term "sound pulsations" we are referring to pressure pulsations occurring at frequencies within a typical human audible frequency range.

To provide a throaty, sporty engine sound experience within the interior of the motor vehicle, a sound transmission line 30 at it's first end 32 is connected to and in communication with the air intake tract 18. Note that in FIG. 1 an exemplary preferred embodiment is illustrated in which the first end 32 is connected to the clean side 26 of the air intake tract 18. In other embodiments however, the first end may be connected at any location along the intake tract, such as to the intake manifold 20, or the clean side 36 of the air cleaner 22, or to the dirty side 38 of the air cleaner, or to any portion of the dirty air duct 40. In all such embodiments, the sound transmission line is in air flow and pressure pulsation communication with some portion of the air intake tract 18. The sound transmission line may comprise one or more interconnected sections of elongated tubing or ducting through which the pressure pulsations in the air intake tract 18 may be communicated.

Continuing to refer to the exemplary embodiment of FIG. 1, at an opposing second end 34 of the sound transmission line 30 a porous and air flow permeable media is arranged to close off the interior of the sound transmission line at the second end 34, thereby preventing air flow and sound from entering or exiting the second end 34 of the sound transmission line 30 without passing through the porous media 42. As the sound-transmitting device 10 lacks an elastic membrane, the undesirable non-linearities and frequency dependent sound distortion characteristics introduced by material properties, mass and elasticity of such membranes are avoided.

The porous media 42 is preferably a media suitable for use as an air filter filtration element. During operation of the engine 16 the air intake tract 18 operates at a slight vacuum relative to ambient air pressure due at least part to the pressure drop occurring at the air filter element 24 and losses occurring along the air intake tract 18. This slight vacuum condition may urge some airflow from the interior 14 of the motor vehicle into the clean side 26 of the air intake tract 18 through the sound transmission line 30. As the air in the clean side 26 is ultimately delivered to the engine 16, it is desirable for this air to be substantially free of particulate contaminants. Therefore, the use of a porous media 42 having selected porosity and characteristics suitable to also function as an air filter element is very preferable.

It is very preferable that the porous media is selected and configured to be substantially transparent to sound transmitted through the media, but also provides a significant restriction to air flow when compared to the air filter element 24. The reason for this is to force the major portion of air flow in the air intake tract 18 to arrive through the air filter element 24 rather than entering as a backflow through the sound transmission line 30. There are many ways in which this can be accomplished.

One way is to assure the sound transmitting porous media 42 has a total pore area and/or pore sizes that provide significantly higher restriction to air flow than is presented by the air filter element 24. Advantageously, this requirement also favors a porous media having a physical size that is much smaller than the size of the air filter element 24, thereby permitting the porous media to be easily placed and hidden within the passenger compartment or within the vehicle interior 14.

Another way to force the major portion of air flow in the air intake tract 18 to arrive through the air filter element 24 rather than entering as a backflow through the sound transmission line 30 is to use a porous media that inherently offers greater restriction to air flow while providing a relative transparency to sound transmissions therethrough. One such porous media configuration is in the general form of an axial flow filter element having channels alternately sealed at opposing ends. The general physical form of such an axial flow filter element is disclosed in US patent publication US 2004/0060861A1, among other places. Such filter elements are now in common use, are available in many sizes and are easily formed of alternating flat and formed layers of filter paper. Filter paper is an example of a porous media that is substantially transparent to sound transmission.

Due to the elegantly simple, efficient delivery of sound into the vehicle interior 14, acoustic tuning of the sound delivered into the vehicle interior 14 may be accomplished by optimizing or adjusting the length and/or diameter of the sound transmission line 30.

Continuing to refer to FIG. 1, for illustration purposes, the porous media is shown as arranged at the second end 34 of the sound transmission line 30 and extending into the interior 14 of the motor vehicle. This is a very effective arrangement for sound transmission into the vehicle interior 14.

While this is one advantageous embodiment of the invention, other embodiments are intended and envisioned. Specifically in a second embodiment of the invention, the second end 34 of the sound transmission line 30 is positioned within the engine compartment 64 of the motor vehicle 12 and does not extend into the vehicle interior 14. In this second embodiment, it is preferable that the second end 34 is positioned proximate to the firewall 44 and the second end 34 is preferably positioned to direct sound towards the vehicle interior 14 through the firewall 44. This second embodiment advantageously provides for physical isolation of the sound transmission line 30 from the vehicle interior 14, thereby eliminating any possible concerns regarding drawing small volumes of air from the vehicle interior 14 through the sound transmitting porous media 42 and sound transmission line 30.

Figure 1B:
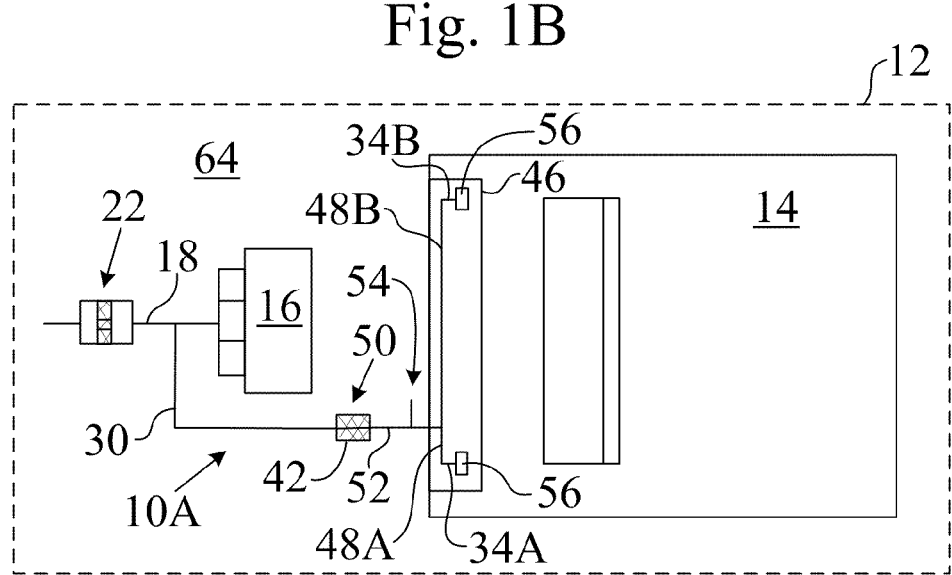
FIG. 1B is a schematic plan view of another embodiment of the device for transmitting engine sound into the interior of the motor vehicle, consistent with the present invention.

In a third embodiment of the invention, the porous media 42 is arranged in a location in the sound transmission line 30 between its two opposing ends (32 and 34), porous media is positioned as illustrated in FIG. 1B but in other aspects essentially the configuration of FIG. 1. In this embodiment the porous media 42 divides the sound transmission line 30 into two sections, where airflow and transmitted sound is required to flow through the porous media 42 to travel between the sections. Advantageously, this embodiment removes the porous media 42 (which is preferably configured as an air filter media) from within the vehicle interior, providing a cleaner interface between the sound transmission line 30 and its mounting location, for example under or behind the dashboard 46 or connected into the HVAC ducting of the vehicle. Without the porous media 42 at the second end 34, the sound transmission line 30 may be of relatively small diameter where it enters the vehicle interior 14, its small size advantageously making it easy to hide or conceal out of sight behind the dashboard 46.

In a fourth embodiment of the invention (shown schematically in FIG. 1B), the sound transmission line 30 may branch into two or more spaced apart branches (example 48A and 48B) within the vehicle interior 14. The ends 34A and 34B may be laterally spaced apart behind the dashboard 46 and positioned to provide a more uniform and balanced sound delivery within the vehicle interior. In the fourth embodiment, the porous media 42 may be arranged along the length of the sound transmission line 30 between its ends, one such position illustrated as position 50 and as discussed above with the third embodiment. In the fourth embodiment, the porous media may be positioned in the engine compartment 64 or within the vehicle interior 14.

In a fifth embodiment, the porous media is 42 is arranged in a location in the sound transmission line 30 between its two opposing ends (32 and 34) and dividing the sound transmission line 30 into two sections. The second portion of the sound transmission line 30 (for example, the portion 52 after the porous media 42 in FIG. 1B) may have a vent portion 54 that vents the sound transmission line 30 either directly or through a filter to the atmosphere. The vent 54 is particularly useful to further reduce the possibility of undesirable odors reaching the vehicle interior 14 from the air intake tract 18. The significant restriction to air flow offered by the porous media 42 relative to the restriction offered by the air filter 24 already makes this unlikely, although the vent 54 is an additional measure.

In a sixth embodiment, the porous media 42 is arranged in a location in the sound transmission line 30 between its two opposing ends (32 and 34) and dividing the sound transmission line 30 into two sections. The second portion of the sound transmission line 30 (for example, the portion 52 after the porous media 42 in FIG. 1B) may have a vent portion 54 that vents the sound transmission line 30 either directly or through a filter to the atmosphere. Additionally a second sound transmitting porous media member 56 is arranged at the ends (for example 34 or 34A and 34B) within the interior 14 of the motor vehicle. The second porous media member(s) 56 provides additional air flow restriction and isolation to even further prevent odors that may rise through the sound transmission line 30 from the air intake tract 18 from ever reaching the vehicle interior 14, venting instead to the atmosphere at the vent 54.

Advantageously, the material(s) of the porous media (42 and/or 56) may also be selected to provide additional sound dampening to reduce transmitted engine sound levels, if and as required by the application.

Figure 2:
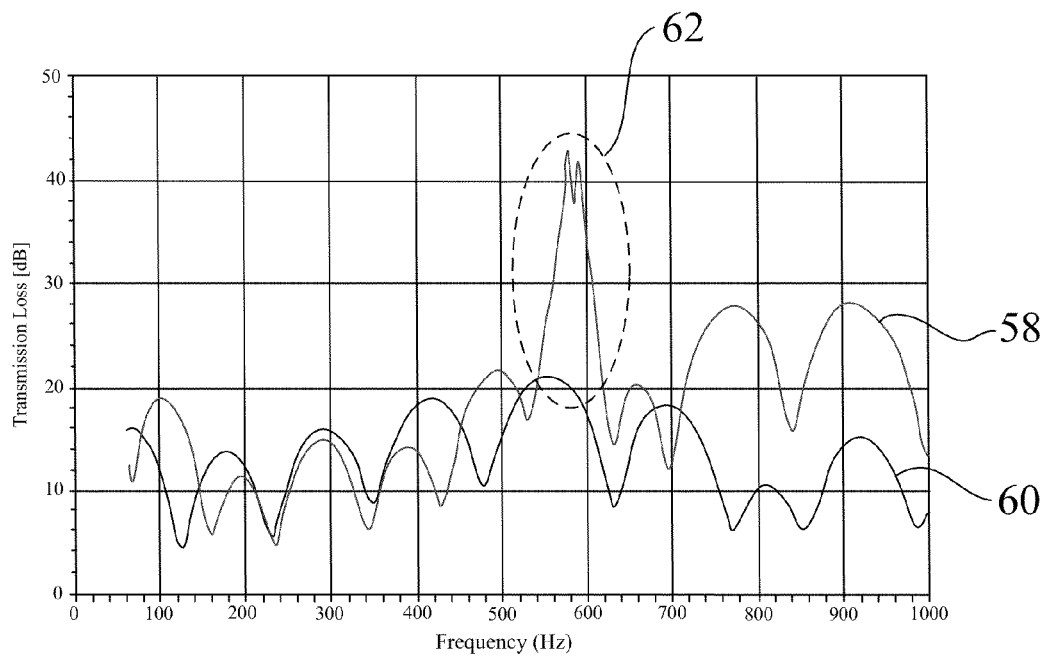
FIG. 2 is a test result plot comparing transmission loss of a sound transmitting device having a sound transmitting diaphragm to a sound transmitting device configured according to the present invention.

Advantages of the present sound transmission device 10 of the present inventive disclosure may be further appreciated by reviewing an exemplary in-line transmission loss test result as presented in FIG. 2. FIG. 2 depicts in a side by side comparative plot of the sound transmission loss vs. frequency of a sound transmission line with the sound transmitting membrane/diaphragm configuration of the prior art, vs. the sound transmission line without the membrane. Note the distortions introduced by the prior art membrane, including the membrane anti-resonance peak 62 at around 570 Hz and the elevated sound transmission loss beginning at around 450 Hz and higher. The specific frequencies and loss levels of the membrane depend upon the characteristics of the membrane selected, however the illustrated principle is generally true. In the present inventive disclosure the sound transmission membrane and its inherent sound distortions are eliminated, thereby providing cleaner and richer engine sounds within the vehicle interior 14.

It has been found that it is preferable for the cross section or internal diameter of the sound transmission line to be no less than approximately 20 mm for optimal acoustic transmission effects.

Preferably the porous media materials are chosen to provide acoustic properties that provide for a necessary level of sound transparency (by which we also mean an acceptable level of sound transmission loss resulting in desired sound level within the vehicle interior) without introducing significant levels of distortion into the transmission loss vs. frequency response curve.

Many different types of porous media material are known. Varieties of such materials are also used for noise reduction, thermal insulation, filtration media and the like. In some embodiments, porous media may be formed of woven or non-woven (fleece) fibrous materials, examples including cotton, mineral wool and artificial fibers, e.g., glass fibers (fiberglass) and polymeric fibers such as polypropylene, polyester and polyethylene fibers. The acoustical properties of fibrous material are at least partially determined by the macroscopic properties of the materials, such as flow resistivity, tortuosity, porosity, bulk density, and bulk modulus of elasticity. Such macroscopic properties are determined to various extents by manufacturing controllable parameters, such as, the density, orientation, and structure of the material. For example, macroscopic properties for fibrous materials are controlled by the shape, diameter, density, orientation and structure of fibers in the fibrous materials. Fibrous materials utilized in sound transmitting porous media may (in various embodiments) contain only a single fiber component or a mixture of several fiber components having different physical properties.

Other types of porous media include structures formed of sheet-like materials, for example filter paper or filter elements comprised of filter paper media. Examples include various types of air and fluid filter elements.

In alternate embodiments, the sound transmitting porous media may comprise varieties of porous foams, examples including polyurethane foam and polyimide foam. Elastic foam media may be chosen to have elastic properties and inertial properties such that they introduce a frequency dependent "tuning" or modification of the transmitted sound, when such tuning is desired.

In various embodiments of the invention, any of the materials discussed above may be utilized, depending upon customer and application requirements. Varieties of filter paper or filter elements made of such papers are preferred due to their transparency to sound transmission, low distortion, low cost and in smaller sized configuration the ability to provide significant restriction (pressure drop vs. flow rate), thereby placing a controllable upper limit on any reverse air flow through the sound transmission line. When filter elements are utilized, they may in some embodiments be of the pleated or of the axial flow varieties as would be known to those skilled in the art of filters and filtration.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims.

The invention is defined solely by the appended claims including any amendments made during the pendency of this application and all equivalents of those claims as issued.

The invention claimed is:

1. A device for transmitting engine sound into an interior of a motor vehicle, comprising: a sound transmission line having a first end and a second end, wherein said first end is in acoustic communication with an air intake tract of an engine and said second end is arranged to direct engine sound towards said motor vehicle interior; and a sound transmitting porous media arranged in-line with said sound transmission line and restricting air flow through said sound transmission line, wherein said porous media is arranged to require air flow through said sound transmitting line from said first end to said second end to pass through said porous media; wherein said porous media is configured and adapted to permit passage of said engine sound; wherein said porous media is a media suitable as an air filtration media, said porous media having a porosity suitable to remove particulate contaminants from said air flow in said sound transmission line; wherein a first side of said porous media is air flow and air pressure pulsation communication with airflow in said air intake tract; wherein an opposing second side of said porous media is in airflow communication with said vehicle interior; wherein said porous media is transparent to transmitted sound; wherein said porous media passes air flow between said vehicle interior and said sound transmission line from said second side to said first side of said porous media: wherein said air intake tract includes an air filter element; and wherein said porous media has a total pore area or pore size that provides significantly higher restriction to air flow than is presented by the air filter element such that a major portion of air flow to said engine occurs through said air filter element rather than said porous media.

2. The device of claim 1 wherein
said sound transmitting porous media is arranged at said second end;
wherein said second end and porous media extend into said vehicle interior.

3. The device of claim 1 wherein
said sound transmitting porous media and said second end are arranged in an engine compartment of motor vehicle;
wherein said second end is positioned to direct said engine sound towards said vehicle interior.

4. The device of claim 1 wherein
said second end of said sound transmitting line is connected into HVAC ducting of said vehicle interior to deliver said engine sounds through said HVAC ducting.

5. The device of claim 1, wherein
said sound transmitting porous media is arranged in said sound transmission line between said first and second ends, dividing said sound transmission line into a first section and a second section;
wherein said sound transmission line extending between said porous media and said second ends is said second section;
wherein said second section branches into a plurality of branches arranged within said vehicle interior, each branch having said second end;
wherein said second ends of said branches are spaced apart within said vehicle interior and directed into said vehicle interior to provide a balanced sound within said vehicle interior.

6. The device of claim 5, further comprising
a plurality of secondary sound transmitting porous media, said secondary porous media arranged at each of said second ends of said branches.

7. The device of claim 6, further comprising
an atmospheric vent provided on said second section and venting said second section to atmosphere outside of said vehicle interior.

8. The device of claim 1, wherein
said sound transmitting porous media is arranged in said sound transmission line between said first and second end, dividing said sound transmission line into a first section and a second section;
wherein said sound transmission extending between said porous media and said second end is said second section;
wherein said second end is arranged within said vehicle interior.

9. The device of claim 8, further comprising
a secondary sound transmitting porous media, said secondary porous media arranged at said second end.

10. The device of claim 9, further comprising
an atmospheric vent provided on said second section and venting said second section to atmosphere outside of said vehicle interior.

11. The device of claim 1 wherein
said porous media comprises fibrous material including any of: cotton, mineral wool, glass fibers, and polymeric fibers.

12. The device of claim 1 wherein
said porous media comprises porous foam.

13. A device for transmitting engine sound into an interior of a motor vehicle, comprising: a sound transmission line having a first end and a second end, wherein said first end is in acoustic communication with an air intake tract of an engine and said second end is arranged to direct engine sound towards said motor vehicle interior; a sound transmitting porous media arranged in-line with said sound transmission line and restricting air flow through said sound transmission line, wherein said porous media is arranged to require air flow through said sound transmitting line from said first end to said second end to pass through said porous media; wherein said porous media is configured and adapted to permit passage of said engine sound; wherein said porous media comprises an axial filter element having a plurality of axially aligned alternately closed channels, said filter element formed of wound layers of flat and formed porous sheet material; wherein a first side of said porous media is air flow and air pressure pulsation communication with airflow in said air intake tract; wherein an opposing second side of said porous media is open to said vehicle interior; wherein said porous media is transparent to transmitted sound; wherein said porous media passes air flow between said vehicle interior and said sound transmission line from said second side to said first side of said porous media wherein said air intake tract includes an air filter element; and wherein said porous media has a total pore area or pore size that provides significantly higher restriction to air flow than is presented by the air filter element such that a major portion of air flow to said engine occurs through said air filter element rather than said porous media.

* * * * *